No. 721,240. PATENTED FEB. 24, 1903.
P. RUDOLPH.
PHOTOGRAPHIC OBJECTIVE.
APPLICATION FILED JULY 15, 1902.
NO MODEL.
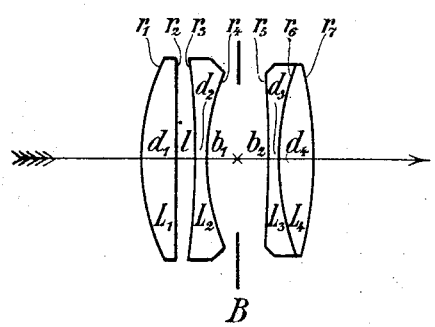

UNITED STATES PATENT OFFICE.

PAUL RUDOLPH, OF JENA, GERMANY, ASSIGNOR TO THE FIRM OF CARL ZEISS, OF JENA, GERMANY.

PHOTOGRAPHIC OBJECTIVE.

SPECIFICATION forming part of Letters Patent No. 721,240, dated February 24, 1903.

Application filed July 15, 1902. Serial No. 115,696. (No model.)

*To all whom it may concern:*

Be it known that I, PAUL RUDOLPH, doctor of philosophy, a subject of the Duke of Saxe-Altenburg, residing at Carl Zeiss strasse, Jena, in the Grand Duchy of Saxe-Weimar, German Empire, have invented a new and useful Photographic Objective, of which the following is a specification.

The objective here to be described is designed for the purposes of photography and projection and is distinguished from the existing types of astigmatically-corrected objectives by the advantage that with comparatively small numbers of components and reflexions a large relative aperture for which the objective is spherically corrected and a relatively large area of anastigmatic flatness of the field is attained. This achievement is the result of arranging four single lenses in two groups separated by the diaphragm, the two components of one of the groups inclosing an air-space between their two surfaces, facing one another, while the two components of the other group are joined in a cemented surface, and the pair of facing surfaces having a negative power, while the cemented surface has a collective effect.

In the annexed drawing a diagram is shown of an objective constructed according to the invention.

The objective described in Patent No. 444,714 and the objective described in Patent No. 660,202 may be considered to have been combined in the present objective. The objective of Patent No. 444,714 is restricted to two groups of cemented lenses separated by the diaphragm, and the opposite effects by which astigmatic correction is obtained are derived solely from the refractive action of cemented surfaces. In the objective of Patent No. 660,202 the said correction is based on the opposite powers of two pairs of facing surfaces, each group of lenses having an air-space between its components. In the new objective the opposite effects producing astigmatic correction are obtained by giving to the power of the cemented surface of the group of lenses in contact the opposite sign to that of the power of the pair of facing surfaces presented by the other group of lenses. There are two ways possible in which this new principle of opposite effects can be realized. First, a negative cemented surface may be employed, together with a positive pair of facing surfaces, and, secondly, a positive cemented surface with a negative pair of facing surfaces. The first combination leads to a less favorable result; but the second combination, which embodies the present invention, is fruitful in an extraordinary degree. A cemented surface at one side of the diaphragm and a pair of facing surfaces at the other side are well known in objectives, which consist of four components arranged in two groups; but hitherto the power of the cemented surface possessed the same sign as the power of the pair of facing surfaces. In the Petzval objective both have dispersive effect, and the same obtains in Steinheil's portraiture antiplanet.

The example of the improved objective shown in the drawing is described below by exact data as to radii, thicknesses, diaphragm intervals, and glasses employed. Where particular conditions demand it, the glasses mentioned may be replaced by other kinds materially differing from them, and the forms of the lenses, as well as the order of their arrangement, may be departed from and still the construction kept within the bounds of the present invention.

The objective shown is spherically corrected for a relative aperture of 1:5.5. The anastigmatic flatness of the image extends to about sixty degrees.

$L^1$ $L^2$ signify the glass lenses; $d^1$ $d^2$, their thicknesses at the axis; $r^1$ $r^2$, the radii of the lens-surfaces; $b^1$ and $b^2$, the distances from the diaphragm to the adjoining lens-fronts, and $l$ the axial distance between the facing surfaces. The numerical values of radii, thicknesses, and distances relate to the focal length of the whole objective as to the unit. Simple multiplication of these values by the focal length required supplies the data of construction for an objective of the desired focus. The glasses used are denoted by $n^D$, $n^F$, and $n^{G'}$, referring, respectively, to the D and F line of the solar spectrum and the H$\gamma$ line of the hydrogen spectrum.

The objective shown consists of the single lenses $L^1$, $L^2$, $L^3$, and $L^4$. $L^1$ and $L^4$ possess collective, $L^2$ and $L^3$ dispersive, effect. The group $L^1$ $L^2$ is separated by the diaphragm B from the group $L^3$ $L^4$. There is an air-space between $L^1$ and $L^2$, and the effect of the pair of facing surfaces $r^2 r^3$ bounding this space is dispersive. $L^3$ and $L^4$ are cemented together at the surface $r^6$, which cemented surface has collective effect.

Radii:
$r^1 = +0.215$
$r^2 = \pm \infty$
$r^3 = -0.742$
$r^4 = +0.208$
$r^5 = -1.113$
$r^6 = +0.252$
$r^7 = -0.367$ Thicknesses and Distances:
$d^1 = 0.033$
$l = 0.019$
$d^2 = 0.011$
$b^1 = 0.030$
$b^2 = 0.030$
$d^3 = 0.011$
$d^4 = 0.030$ Glasses used:

|  | $L^1$. | $L^2$. | $L^3$. | $L^4$. |
|---|---|---|---|---|
| $n^D$ | 1.61132 | 1.60457 | 1.52110 | 1.61132 |
| $n^F$ | 1.61870 | 1.61436 | 1.52820 | 1.61895 |
| $n^{G'}$ | 1.62462 | 1.62252 | 1.53397 | 1.62514 |

What I claim as my invention, and desire to secure by Letters Patent, is—

A spherically, chromatically and astigmatically corrected objective, consisting of four lenses separated by the diaphragm into two groups each of two lenses, of which groups one includes a pair of facing surfaces and the other a cemented surface, the power of the pair of facing surfaces being negative and that of the cemented surface positive.

In testimony whereof I have signed my name to this specification in the presence of two subscribing witnesses.

PAUL RUDOLPH.

Witnesses:
EMIL DÖNITZ,
PAUL KRÜGER.

DISCLAIMER.

721,240.—*Paul Rudolph*, Jena, Germany. PHOTOGRAPHIC OBJECTIVE. Patent dated February 24, 1903. Disclaimer filed October 21, 1914, by the assignee, *The Firm of Carl Zeiss*.

Enters this disclaimer—

"To the claim in said specification, in so far as it relates to objectives of the kind claimed, of which the group of lenses, including a pair of facing surfaces does not consist of an exterior collective lens and an interior dispersive lens.

[*Official Gazette, November 25, 1914.*]